US008204901B2

(12) United States Patent
Pimpale et al.

(10) Patent No.: US 8,204,901 B2
(45) Date of Patent: Jun. 19, 2012

(54) GENERATING QUERY PREDICATES FOR PROCESSING MULTIDIMENSIONAL DATA

(75) Inventors: Mandar S. Pimpale, San Jose, CA (US); David G. Wilhite, Jr., Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 12/552,965

(22) Filed: Sep. 2, 2009

(65) Prior Publication Data
US 2011/0055149 A1  Mar. 3, 2011

(51) Int. Cl.
*G06F 17/30* (2006.01)
(52) U.S. Cl. ......... 707/769; 707/758; 707/600; 707/778
(58) Field of Classification Search .................. 707/758, 707/769, 778, 600
See application file for complete search history.

(56) References Cited

U.S. PATENT DOCUMENTS

| | | | |
|---|---|---|---|
| 6,839,711 B1 * | 1/2005 | Reddy et al. ................... | 707/802 |
| 7,047,231 B2 | 5/2006 | Grasshoff et al. | |
| 7,249,120 B2 | 7/2007 | Bruno et al. | |
| 7,483,888 B2 | 1/2009 | Faunce et al. | |
| 7,779,031 B2 * | 8/2010 | Grosset et al. ................. | 707/770 |
| 7,831,615 B2 * | 11/2010 | Bailey ............................ | 707/779 |
| 7,831,617 B2 * | 11/2010 | Bruckner et al. ............. | 707/783 |
| 7,873,669 B2 * | 1/2011 | Netz et al. ...................... | 707/796 |
| 7,899,837 B2 * | 3/2011 | Polo-Malouvier et al. ... | 707/759 |
| 7,937,401 B2 * | 5/2011 | Pasumansky et al. ........ | 707/759 |
| 7,949,674 B2 * | 5/2011 | Middelfart ..................... | 707/769 |
| 7,987,176 B2 * | 7/2011 | Latzina et al. ................. | 707/713 |
| RE42,870 E * | 10/2011 | Seibel et al. .................... | 707/769 |
| 8,069,188 B2 * | 11/2011 | Larson et al. .................. | 707/802 |
| 8,090,730 B2 * | 1/2012 | Shahabi et al. ............... | 707/756 |
| 8,090,733 B2 * | 1/2012 | Bayliss .......................... | 707/758 |
| 8,103,687 B2 * | 1/2012 | Baumgartner et al. ....... | 707/758 |
| 2002/0184187 A1 * | 12/2002 | Bakalash et al. ................ | 707/1 |
| 2003/0093424 A1 * | 5/2003 | Chun et al. ....................... | 707/7 |

(Continued)

OTHER PUBLICATIONS

Sandro Bimonte, et al. "An OLAP Solution Using Mondraian an JPIVOTE," Power Point Presentation, pp. 1-77.

(Continued)

*Primary Examiner* — Rehana Perveen
*Assistant Examiner* — Tiffany Thuy Bui
(74) *Attorney, Agent, or Firm* — Patterson & Sheridan, LLP

(57) ABSTRACT

Systems, methods and articles of manufacture are disclosed for generating a relational database query from an online analytical processing (OLAP) query against a cube. The cube may have dimensions, each dimension having a hierarchy of members. A level of the hierarchy of a dimension of the cube may be identified from which the OLAP query accesses a number of members exceeding a predefined threshold count of members. A relational database query may be generated that includes a predicate for at least one member from at least one level above the identified level in the hierarchy, instead of a plurality of predicates for members from the identified level. The relational database query may be generated from the OLAP query, from a definition for the hierarchy, and from the accessed members from the identified level. As a result, the relational database query may include fewer predicates and may be executed more efficiently.

12 Claims, 7 Drawing Sheets

U.S. PATENT DOCUMENTS

| | | |
|---|---|---|
| 2003/0195881 A1 | 10/2003 | Koo et al. |
| 2005/0010565 A1 | 1/2005 | Cushing et al. |
| 2007/0061287 A1 | 3/2007 | Le et al. |
| 2007/0208721 A1 | 9/2007 | Zaman et al. |
| 2007/0271227 A1 | 11/2007 | Momen-Pour et al. |
| 2008/0052282 A1 | 2/2008 | Muras |
| 2008/0294613 A1 | 11/2008 | Iyer et al. |

OTHER PUBLICATIONS

Panos Kalnis, et al. "Multi-Query Optimization for Online Analytical Processing," Elsevier Science Ltd, (2003), pp. 457-473.

Kazi A. Zaman, et al. "Modeling and Querying Multidimensional Data Sources in Siebel Analytics" Siebel Systems Inc., (2005), pp. 1-29.

\* cited by examiner

GENERATING QUERY PREDICATES FOR PROCESSING MULTIDIMENSIONAL DATA

BACKGROUND OF THE INVENTION

1. Field of the Invention

Embodiments of the invention relate to computer-based multidimensional data modeling. More specifically, embodiments of the invention relate to generating queries for an online analytical processing (OLAP) system.

2. Description of the Related Art

Many companies today store vast amounts of data in online transaction processing (OLTP) systems and other databases. For example, the data may include business data such as sales, product, and financial data. Decision-makers frequently rely on such data in making business decisions.

However, unlike OLTP systems, which typically capture transaction data for a business, online analytical processing (OLAP) systems analyze the transaction data at an aggregate level to further inform decision-making. For example, a business analyst may interpret data aggregated across various business dimensions in an OLAP system. The business analyst may browse, in various contexts, data from the OLAP system. For instance, the business analyst may view sales by product by customer by time, defects by manufacturing plant by time, etc.

Generally, OLAP allows multidimensional analysis of data. That is, OLAP provides data in a form of "views" or "dimensions" that are organized to reflect a multidimensional nature of the data. An OLAP system typically includes data models that allow business analysts to interactively explore data across multiple viewpoints at multiple levels of aggregation, also referred to as levels. An increasingly popular data model for OLAP systems is a data cube (or simply, cube). An OLAP system may store a number of cubes. Each cube includes a set of dimensions (e.g., Time, Geography, Product, etc.). A dimension typically comprises many levels, and the levels are typically hierarchical (e.g., Month, Quarter, and Year for the Time dimension; City, State, and Country for the Geography dimension, etc.).

SUMMARY OF THE INVENTION

One embodiment of the invention includes a method, the method including configuring one or more computer processors to perform an operation for generating a Structured Query Language (SQL) query from an online analytical processing (OLAP) query against a cube. The operation may generally include receiving the OLAP query against the cube, the cube having a plurality of dimensions, each dimension including a hierarchy of members; identifying, based on the received OLAP query and a definition for a dimension hierarchy for the cube, a level of the hierarchy of a dimension of the cube from which the OLAP query accesses a plurality of members exceeding a predefined threshold count of members; and generating, by operation of the one or more computer processors, from the received OLAP query, from the definition for the dimension hierarchy for the cube, and from the accessed plurality of members from the identified level, a SQL query that includes a predicate for at least one member from at least one level above the identified level in the hierarchy.

Another embodiment of the invention includes a computer-readable storage medium containing a program, which, when executed on a processor, performs an operation for generating a Structured Query Language (SQL) query from an online analytical processing (OLAP) query against a cube. The operation may generally include receiving the OLAP query against the cube, the cube having a plurality of dimensions, each dimension including a hierarchy of members. The operation may also include identifying, based on the received OLAP query and a definition for a dimension hierarchy for the cube, a level of the hierarchy of a dimension of the cube from which the OLAP query accesses a plurality of members exceeding a predefined threshold count of members; and generating, from the received OLAP query, from the definition for the dimension hierarchy for the cube, and from the accessed plurality of members from the identified level, a SQL query that includes a predicate for at least one member from at least one level above the identified level in the hierarchy.

Still another embodiment of the invention includes a system having one or more computer processors and a memory containing a program, which when executed by the one or more computer processors is configured to perform an operation for generating a Structured Query Language (SQL) query from an online analytical processing (OLAP) query against a cube. The operation may generally include receiving the OLAP query against the cube, the cube having a plurality of dimensions, each dimension including a hierarchy of members; identifying, based on the received OLAP query and a definition for a dimension hierarchy for the cube, a level of the hierarchy of a dimension of the cube from which the OLAP query accesses a plurality of members exceeding a predefined threshold count of members; and generating, by operation of the one or more computer processors, from the received OLAP query, from the definition for the dimension hierarchy for the cube, and from the accessed plurality of members from the identified level, a SQL query that includes a predicate for at least one member from at least one level above the identified level in the hierarchy.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
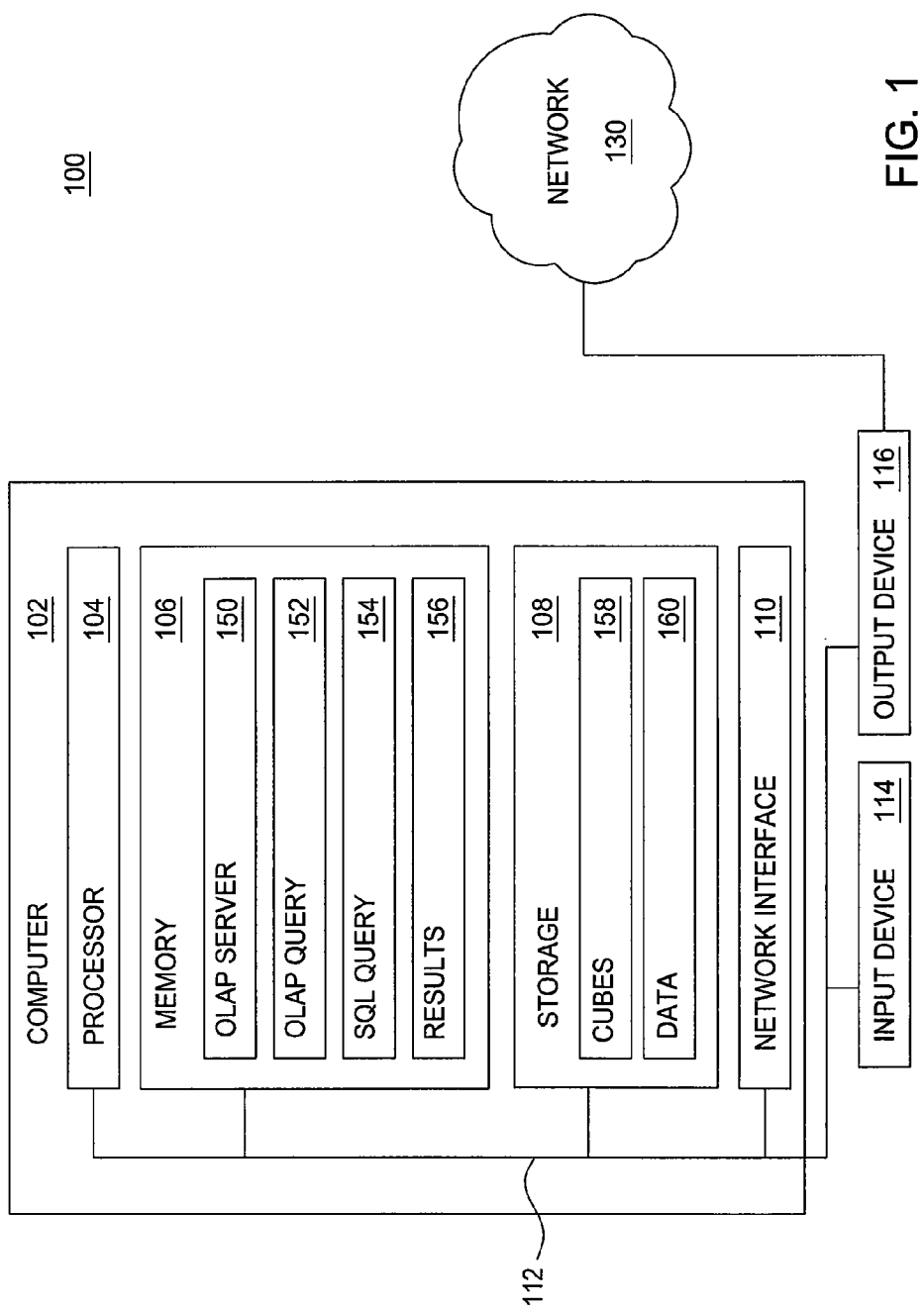
FIG. 1 is a block diagram illustrating a system for generating queries for OLAP processing, according to one embodiment of the invention.

OLAP systems typically aggregate data across various dimensions at various levels to provide different views of the data at different levels of aggregation. The data may be aggregated over various periods of time, by geography, by teams and by product, depending on the type and organization of the business. Aggregated data is commonly referred to as an aggregation. For example, an aggregation may be the sales data for the month of July for a specified product. A slice typically comprises a level from at least a subset of dimensions, and aggregations are typically associated with a slice.

Further, each dimension of a cube includes a number of members. The members of a dimension may be organized into a hierarchy by the levels of the dimension. For example, a cube may include a Geography dimension having members representing various geographic locations (e.g., USA, California, San Francisco, etc.). A member representing San Francisco (existing at the City level of the hierarchy of the geography dimension) may be arranged in the hierarchy as a child member of a member representing California (existing at the State level of the hierarchy). Similarly, the member representing California may, in turn, be arranged in the hierarchy as a child member of a member representing USA (existing at thee Country level of the hierarchy).

A cube may also include measures, i.e., metrics aggregated along dimensional hierarchies of the cube. For example, a cube may include a Total Sales measure for various products over various time periods. Similarly, the cube may also include an Average Sales measure. A user may query an individual cell of the cube by identifying a member in each dimension and a measure.

Typically, business analysts issue OLAP queries to retrieve data and may request aggregations at various levels. If the aggregations are not available, then the OLAP system may compute the aggregations in real-time. Because computing aggregations may be time consuming, various OLAP systems store pre-computed aggregations to process OLAP queries more efficiently.

Examples of operations typically supported by OLAP systems include calculation and modeling applied across dimensions through hierarchies or across members, trend analysis over sequential time periods, slicing subsets for on-screen viewing of the data, drill-down to deeper levels of consolidation of the data, reach-through to underlying detail data, and rotation to new dimensional comparisons in a viewing area associated with the data. An example of an OLAP system is InfoSphere™ Warehouse Cubing Services, available from International Business Machines Corp. (IBM®) of Armonk, N.Y.

In processing an OLAP query, an OLAP server (of an OLAP system) may derive a value of a cell in a cube from data residing outside of the cubes of the OLAP system. For example, the data may reside in an underlying (relational) database. To produce a cell value, an OLAP server may analyze a cell to determine which measure and what members from other dimensions are associated with the cell. Further, if the cell value is not available (i.e., has not been precomputed, or is out of date relative to the underlying data), the OLAP server may generate a relational database query to determine the cell value from the database. The relational database query may aggregate database rows matching dimensional criteria (e.g., rows associated with a time period and product of the cell). An example of a query language for OLAP systems is Multidimensional Expressions (MDX) from Microsoft® Corp. of Redmond, Wash. An example of a query language for relational databases is Structured Query Language (SQL). For instance, in processing an MDX query against a cube, the OLAP server may generate an SQL query from dimension members and from a measure associated with a cell of the cube. As a result, the relational database aggregates only data relevant to the cell (e.g., based on constraints in a WHERE clause of the SQL statement) and returns the aggregated data to the OLAP server. In general, OLAP queries can fetch data at multiple levels of aggregation, and in one embodiment, one SQL query is generated for each distinct level of aggregated data reference by or contained in the OLAP query.

As is known, the WHERE clause of a SQL query restricts the number of rows returned by the SQL query and includes one or more SQL predicates (or simply, predicates). For example, the clause WHERE store_city='San Jose' OR store_city='San Francisco' includes two predicates: store_city='San Jose' and store_city='San Francisco'. A predicate refers to a language element of SQL that specifies a condition that may be evaluated to Boolean truth values (e.g., true, false, or unknown).

In processing MDX queries, the OLAP server may generate SQL queries that are large and complex. For example, an MDX query may often reference a function for populating members of a specified hierarchy or of a specified level of the hierarchy. For larger hierarchies, the OLAP server may generate a SQL query that includes include thousands (or even millions) of predicates. Executing such SQL queries against a relational database may be time consuming.

Embodiments of the present invention generally provide techniques for generating SQL predicates from an MDX query (i.e., an example of an OLAP query). One embodiment of the invention provides an OLAP server. The OLAP server may receive an MDX query against a cube. The OLAP server may identify multiple cells of a dimension of the cube that are accessed by the MDX query (e.g., based on definitions for the dimension hierarchies of the cube). For example, the OLAP server may have previously generated and/or stored definitions for each dimension hierarchy of the cube. The OLAP server may generate one or more SQL predicates from the identified cells and the definitions for the dimension hierarchies of the cube. For example, suppose the geography dimension of the cube includes a member representing California (i.e., at a State level of the dimension hierarchy). Further, suppose that the member representing California is associated with two child members, San Jose, San Francisco, and Los Angeles. If the OLAP server determines that the MDX query accesses the members representing San Jose and San Francisco, the OLAP server may generate the SQL predicate store_state='California'. In effect, the OLAP server may reduce the number of SQL predicates generated for an MDX query. Thus, the OLAP server may process the MDX queries more efficiently as the underlying relational database may process the generated SQL queries more efficiently.

Further, the OLAP server may perform less erratically than by omitting all predicates for dimensional constraints from a WHERE clause (e.g., omitting the WHERE clause from a SELECT statement entirely). For example, the OLAP server may omit all predicates for dimensional constraints if the number of members referenced by an MDX query exceeds a specified threshold number of members for a given level of the dimension hierarchy. For instance, if the threshold is eighty percent of child members, an OLAP query just below the threshold may take a long time to process. In contrast, an OLAP query just above the threshold may take a much shorter time to process. Thus, an all-or-nothing approach for including predicates may lead to an irregular performance profile. By using a fine-grained approach for including predicates, the OLAP server may exhibit a smoother performance profile over MDX queries that access different numbers of members of a hierarchy of the cube.

While embodiments may be described herein with reference to an OLAP server, SQL queries, and MDX queries, those skilled in the art will recognize that embodiments of the invention may be adapted to support other OLAP systems, database systems, and/or query languages.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for generating queries for OLAP processing, according to one embodiment of the invention. The networked system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

Figure 3:
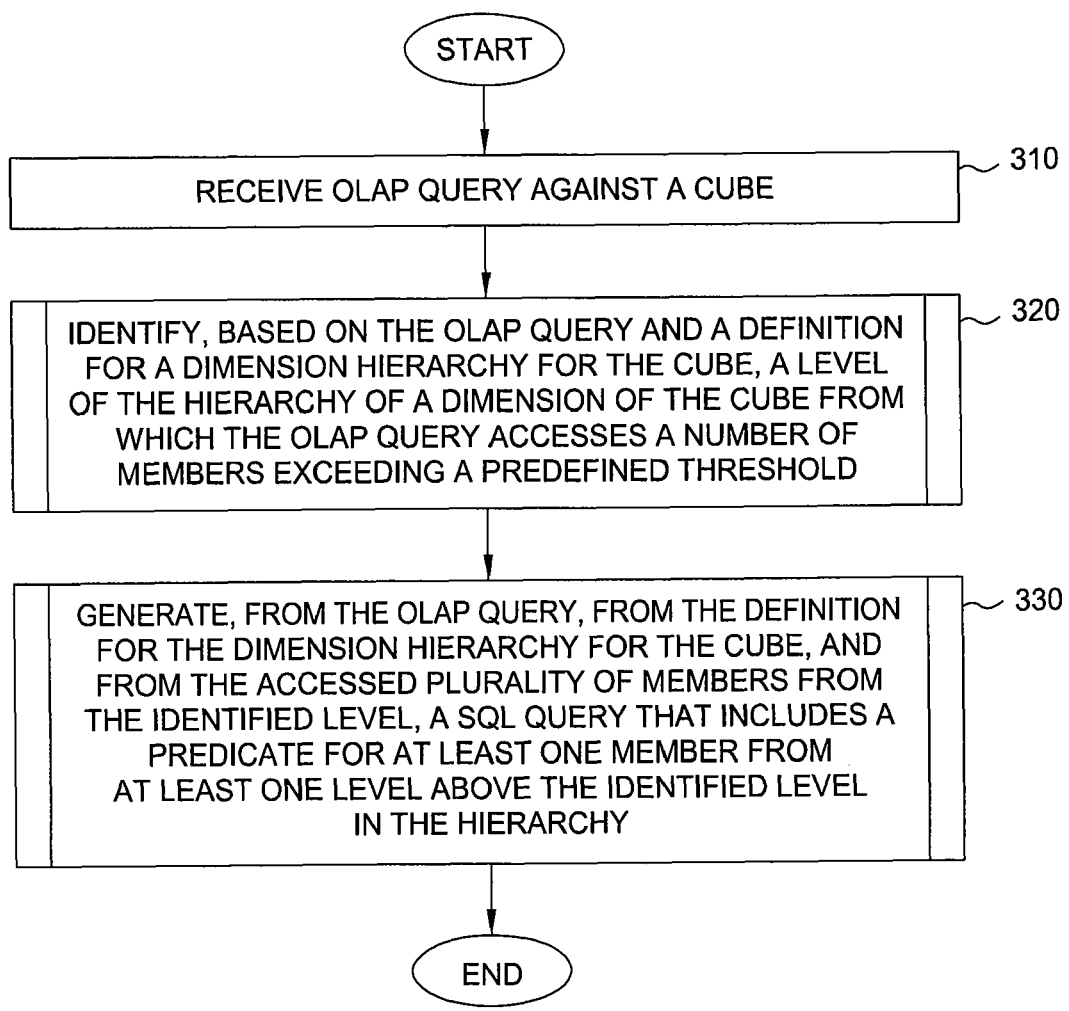
FIG. 3 is a flowchart depicting a method for generating a SQL query from the OLAP query against the cube, according to one embodiment of the invention.
Figure 4:
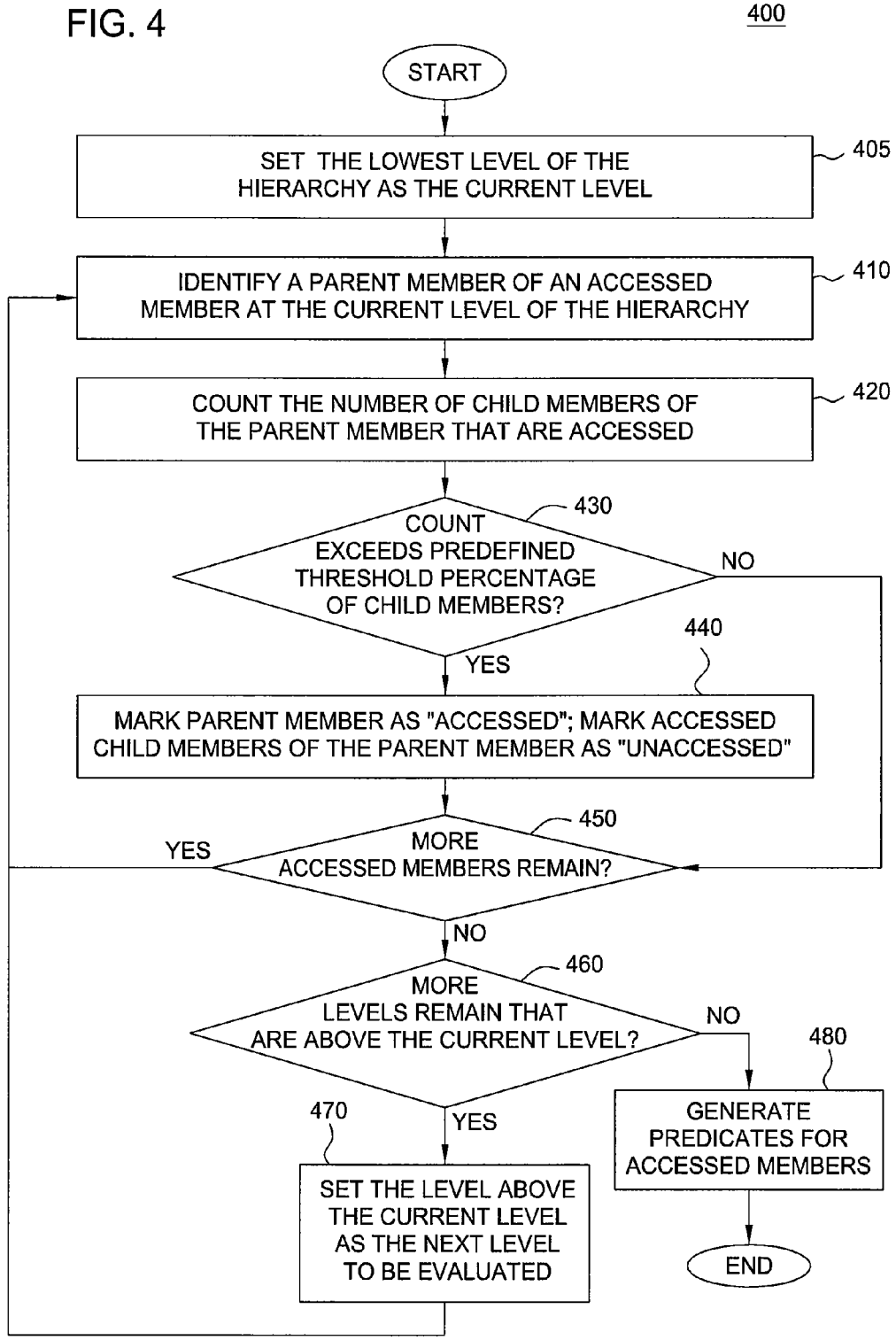
FIG. 4 is a flowchart depicting a method for generating SQL predicates for the OLAP query against the cube, according to one embodiment of the invention.
Figure 5:
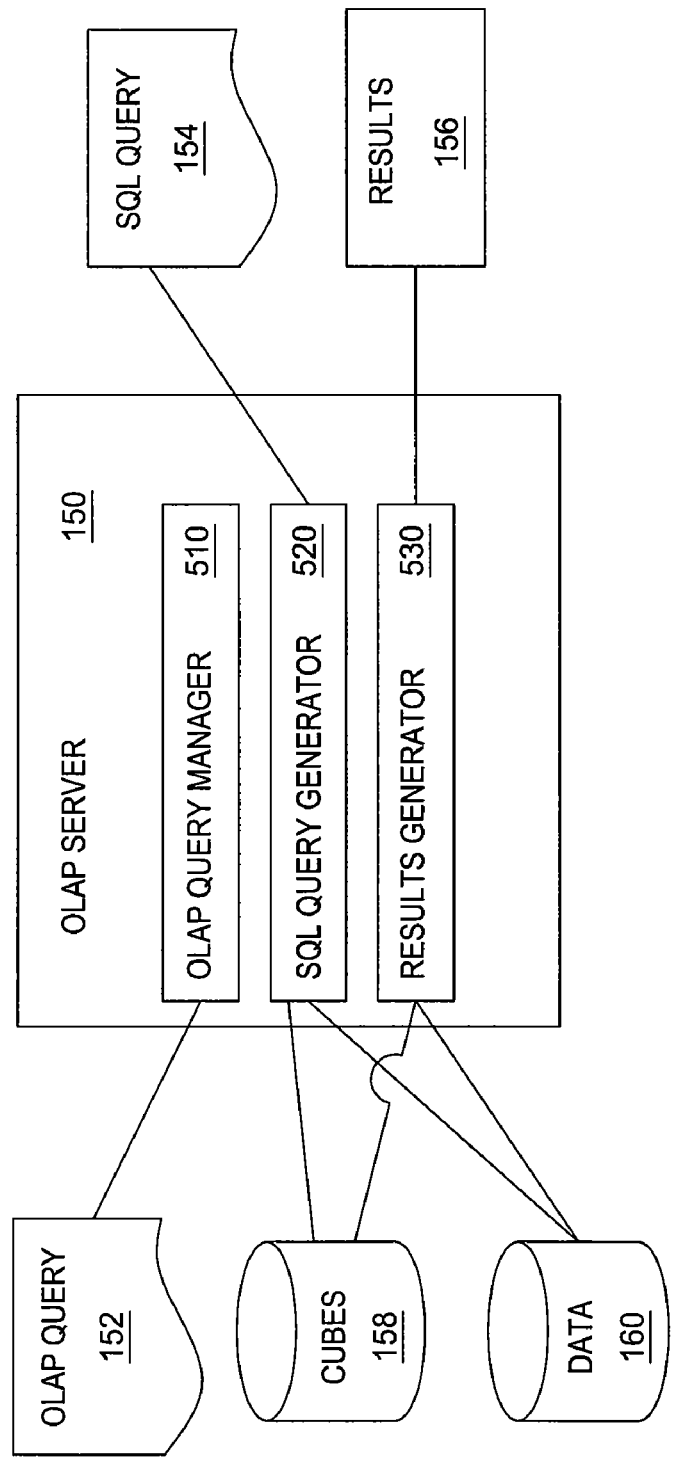
FIG. 5 is a block diagram illustrating components of an OLAP server, according to one embodiment of the invention.

As shown, the memory 106 of the computer 102 includes an OLAP server 150, an OLAP query 152, a SQL query 154, and results 156. The storage 108 of the computer 102 includes cubes 158 and data 160. FIGS. 3 through 5 and associated descriptions detail the structure and operation of the OLAP server 150 running on the computer 102.

In one embodiment, the OLAP Server may be any software application that summarizes vast amounts of detailed data to provide access to summarized data (in the form of cubes 158). The detailed data, or simply data 160, may be stored in a relational database. The OLAP server 150 may generate the cubes 158 from the data 160 and store the cubes 158 in a dimensional data store. Further, the OLAP server 150 may precompute one or more cells of the cube 158 by querying the relational database. The precomputed cells may be stored in the cube 158. The OLAP server 150 may also generate and store definitions for dimension hierarchies for the cube 158. The OLAP server 150 may store the definitions outside of, or as part of, the cubes 158. Further, in another embodiment, both the data 160 and the cubes 158 may be stored in a relational database.

Figure 2A:
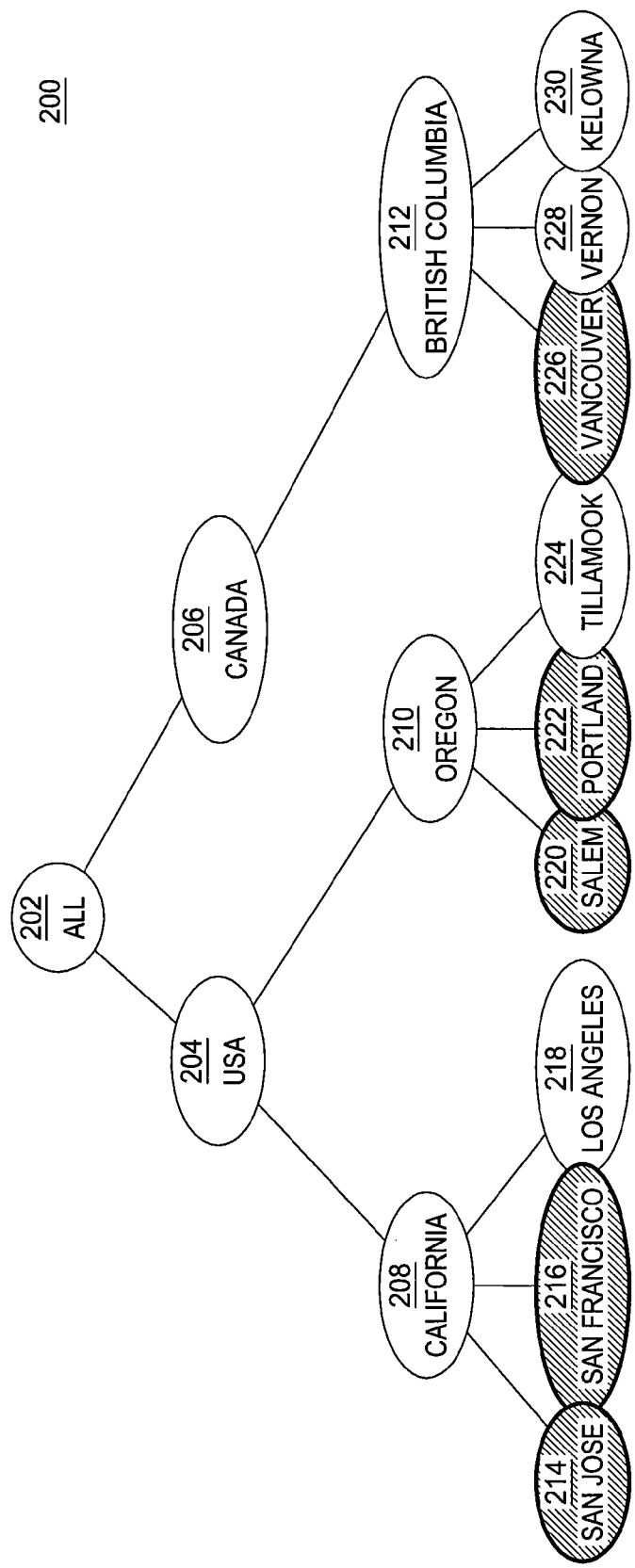
FIGS. 2A-2C illustrate a hierarchy for a dimension of a cube, according to one embodiment of the invention.
Figure 2B:
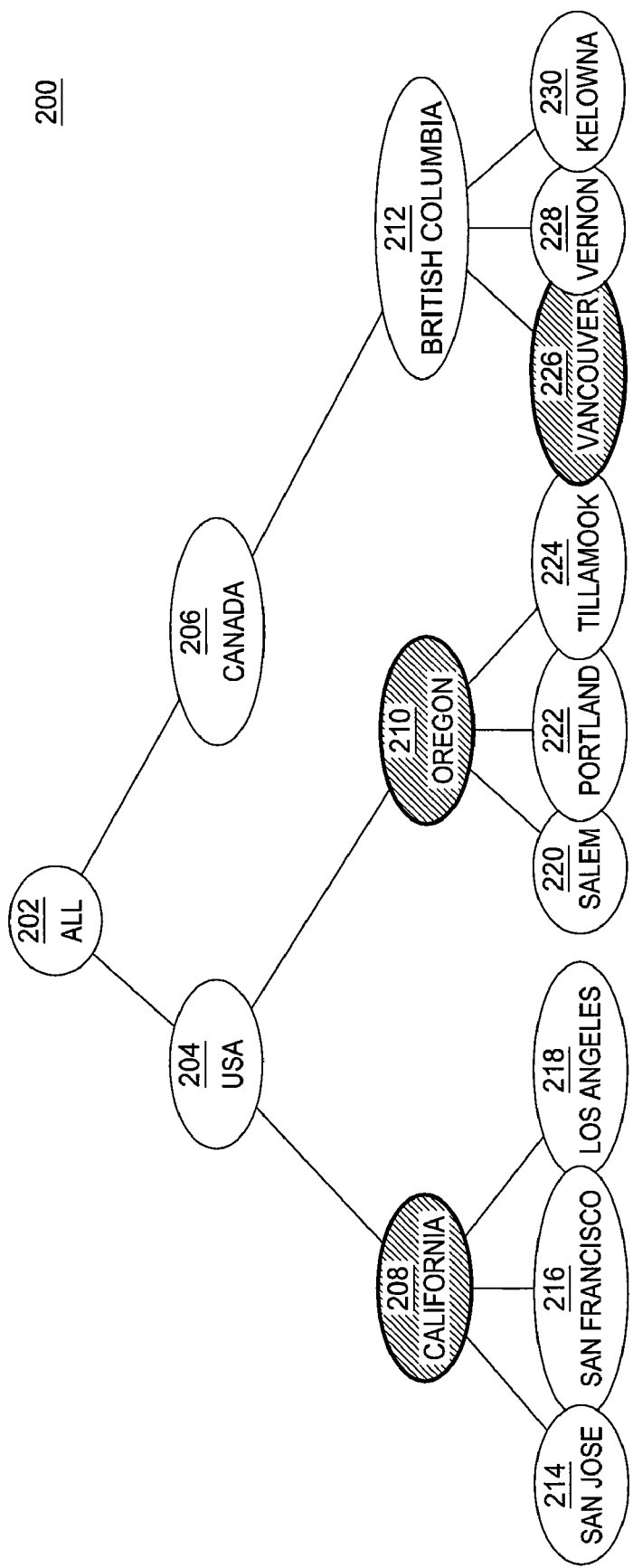
Figure 2C:
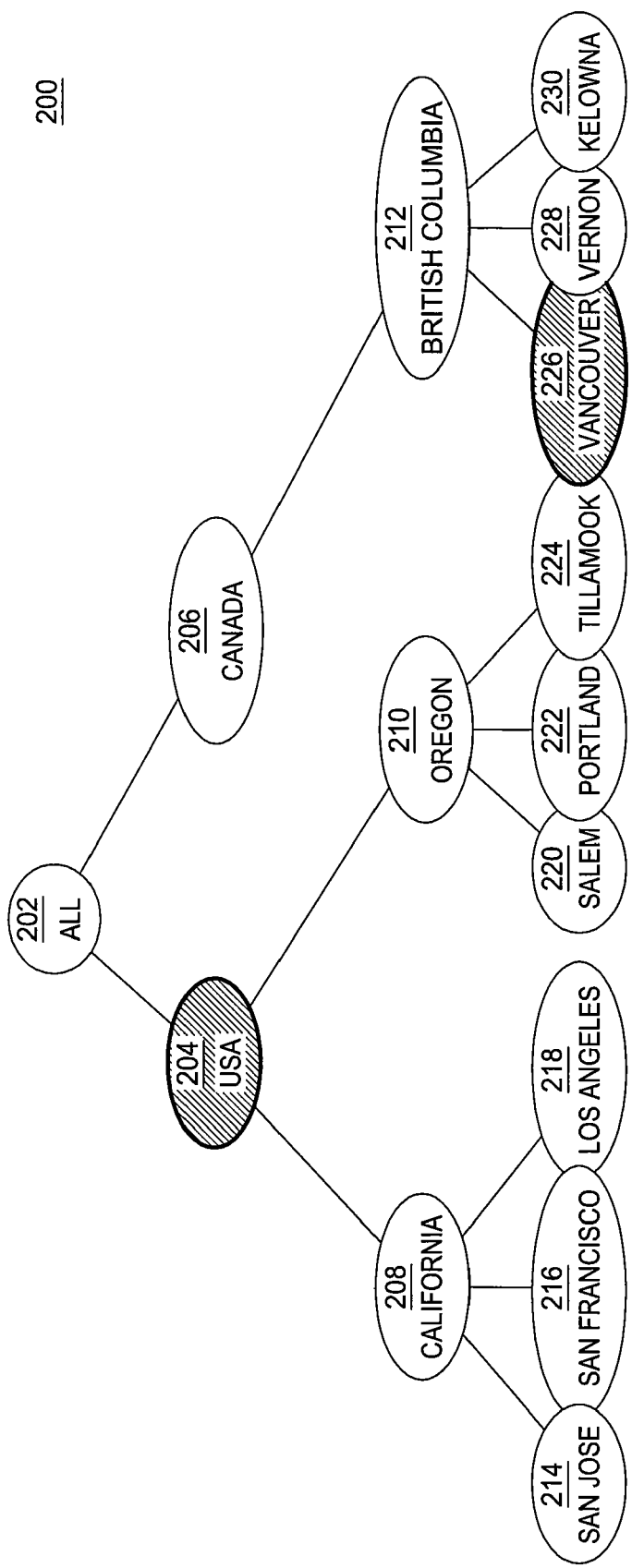

FIGS. 2A-2C illustrate a hierarchy 200 for a (Geography) dimension of a cube 158 of FIG. 1, according to one embodiment of the invention. As shown in FIG. 2A, the hierarchy 200 includes fifteen members. The fifteen members include: All (geographic locations) 202, USA 204, Canada 206, California 208, Oregon 210, British Columbia 212, San Jose 214, San Francisco 216, Los Angeles 218, Salem 220, Portland 222, Tillamook 224, Vancouver 226, Vernon 228, and Kelowna 230. Further, All 202 resides at a first level (representing all geographic locations) of the hierarchy 200. USA 204 and Canada 206 reside at a second level (representing countries) of the hierarchy 200. California 208, Oregon 210, and British Columbia 212 reside at a third level (representing state and/or province) of the hierarchy 200. San Jose 214, San Francisco 216, Los Angeles 218, Salem 220, Portland 222, Tillamook 224, Vancouver 226, Vernon 228, and Kelowna 230 reside at a fourth level (representing city) of the hierarchy.

As shown in the hierarchy 200, child members of All 202 include USA 204 and Canada 206. Put another way, a parent for USA 204 and Canada 206 is All 202. Similarly, child members of USA 204 include California 208 and Oregon 210. A child member of Canada 206 is British Columbia 212. Child members of California 208 include San Jose 214, San Francisco 216, Los Angeles 218. Child members of Oregon include Salem 220, Portland 222, and Tillamook 224. Child members of British Columbia 212 include Vancouver 226, Vernon 228, and Kelowna 230.

In one embodiment, the OLAP server 150 receives an MDX query. Suppose the OLAP server 150 receives the following MDX query:

TABLE I

OLAP query example

SELECT { [Geography].[USA], [Geography].[Canada] } ON axis(0)
FROM [Sales];

As shown in Table I, the OLAP query 152 retrieves store sales for two members (namely, USA 204 and Canada 206) in the Geography dimension of a cube 158 for store sales (namely, "Sales"). Further, OLAP elements are shown in brackets ("[ ]") and reference measures of the dimensional hierarchy of the cube 158. In processing the OLAP query 152, the OLAP server 150 may generate the following SQL query:

TABLE II

SQL query example

SELECT d1.store_country, ...
FROM <fact table FT, dimension tables D1, D2, ... >
WHERE <join fact table to dimension tables>
   AND (D1.store_country=' USA' OR D1.store_country=' Canada' )
GROUP BY store_country As shown in Table II, the SQL query 154 retrieves, from the data 160, store sales for the two members in the Geography dimension of the cube 158 for store sales. The WHERE clause of the SQL query 154 includes primary key/foreign key joins of tables of the data 160 (e.g., fact table and dimension tables of a star schema or of a snowflake schema of the data 160). As is known, a dimensional data warehouse may typically include a star schema or a snowflake schema to support more efficient data retrieval operations against the dimensional data warehouse. In the star schema, each dimension is represented as a single table, whereas in the snowflake schema, each dimension is represented as multiple tables. Further, the WHERE clause of the SQL query 154 includes one or more predicates for dimensional constraints (e.g., D1.store_country='USA'), based on members accessed by the MDX query (namely, USA 204 and Canada 206).

However, the more members are referenced by an OLAP query 152 received by an OLAP server 150, the more predicates are included in a corresponding SQL query 154 generated by the OLAP server 150. Each additional predicate of the SQL query 154 may result in an additional performance cost of executing the SQL query 154. Further, dimension hierarchies may often include thousands (or even millions) of members. Further still, an OLAP query may often reference a function for populating members of a specified hierarchy or of a specified level of the hierarchy. Thus, a generated SQL query 154 may include many predicates. Consequently, executing such a SQL query 154 may require an undesirable or unacceptable cost in terms of processing resources and/or time.

In one embodiment, the OLAP server 150 generates an SQL query 154 having a reduced number of predicates. For a OLAP query 152 executed against a cube 158, the OLAP server 150 may identify members of the cube 158 accessed by the OLAP query 152. For each parent of each accessed member, the OLAP server 150 may determine whether a percentage of children of the parent accessed by the OLAP query 152 exceeds a predefined threshold. If so, the OLAP server 150 may mark a parent as "accessed" by the OLAP query 152 (i.e., for which a predicate may be later generated) and unmark each accessed child as "accessed" by the OLAP query 152 (i.e., for which a predicate need not be generated). The OLAP server 150 may then generate a predicate for all accessed members (children and parents) of the cube. In effect, the OLAP server 150 may generate a predicate for a parent rather than a predicate for each of the accessed child members of the parent. In other words, the OLAP server 150 generates a predicate that includes the parent and excludes the accessed child members. In one embodiment, the OLAP server 150 may also recursively evaluate ancestors (grandparent, great-grandparent, etc.) of an accessed member, to determine whether a percentage of accessed child members (i.e., immediate children) of the ancestor exceeds the predefined threshold, and so forth.

For example, suppose the OLAP server 150 receives the following OLAP query:

TABLE III

OLAP query example two

SELECT { [Geography].[San Jose], [Geography].[San Francisco],
         [Geography].[Salem], [Geography].[Portland],
         [Geography].[Vancouver] } on axis(0)
FROM [Sales];

As shown in Table III, the OLAP query retrieves store sales for five members (namely, San Jose 214, San Francisco 216, Salem 220, Portland 222, and Vancouver 226) in the Geography dimension of the cube 158 for store sales. The OLAP server 150 may identify the five members as "accessed" members of the cube 158. FIG. 2A distinguishes the accessed members, which are shown as shaded, from un-accessed members, which are shown as unshaded.

In one embodiment, the OLAP server 150 may determine whether a parent of an accessed member has a percentage of accessed members exceeding a predefined threshold. The predefined threshold may also be adjusted by a user. For example, suppose the predefined threshold is sixty percent. Referring again to FIG. 2A, the OLAP server 150 may determine that the parent California 208 has, out of three total children (namely, San Jose 214, San Francisco 216, and Los Angeles 218), two children accessed by the OLAP query 152 (namely, San Jose 214 and San Francisco 216), for approximately 66.67%. Because 66.67% is greater than sixty percent, the OLAP server 150 may mark the parent California 208 as "accessed" and unmark San Jose 214 and San Francisco 216 as accessed, as shown in FIG. 2B. The operation of marking a parent member as "accessed" and unmarking accessed child members of the parent member (thereby rendering the child members "un-accessed") may be referred to herein as "promoting" the parent member. Further, predicates for promoted members of the cube 158 may result in data being over-fetched (i.e., data retrieved from the data 160 by the SQL query 154 that is not required for processing the OLAP query 152). As further discussed below, such over-fetched data may subsequently be ignored by the OLAP server 150.

In one embodiment, the number of predicates of a SQL query 154 is proportional to the number of accessed members of a hierarchy. Further, promoting a parent member of a hierarchy frequently yields a net reduction of (or infrequently, no change in) the number of "accessed" members in the hierarchy. Therefore, promotion may result in fewer predicates in a later-generated SQL query 154.

Further, the OLAP server 150 may similarly evaluate other parents of accessed members of the cube 158. For example, referring again to FIG. 2A, the parent Oregon 210 has, out of three total children, two children accessed by the OLAP query 152 (namely, Salem 220 and Portland 222). Thus, the OLAP server 150 may promote parent Oregon 210 for exceeding the predefined threshold (i.e., because 66.67% is greater than sixty percent). FIG. 2B also illustrates the promoted Oregon 210. Similarly, referring again to FIG. 2A, the parent British Columbia 212 has, out of three total children (namely, Vancouver 226, Vernon 228, and Kelowna 230), only one child accessed by the OLAP query 152 (namely, Vancouver 226). Because approximately 33.33% is not greater than sixty percent, the OLAP server 150 does not promote the parent British Columbia 212. FIG. 2B illustrates the parent British Columbia 212 in an un-promoted state.

In one embodiment, the OLAP server 150 may also recursively promote ancestors of an accessed member of the cube 158. For example, referring again to FIG. 2B, the grandparent USA 204 has, two out of two children (i.e., one hundred percent) accessed by the OLAP query 152 (namely, the promoted parents California 208 and Oregon 210). Because one hundred percent is greater than sixty percent, the OLAP server 150 may promote the grandparent USA 204. FIG. 2C illustrates the grandparent USA 204 in a promoted state.

In one embodiment, the OLAP server 150 may also promote a root member of a hierarchy. For example, suppose the predefined threshold is forty percent (rather than sixty percent). The root All 202 of FIG. 2C has one (namely, USA 204) of two children (namely, USA 204 and Canada 206) accessed by the OLAP query 152. Because fifty percent is greater than forty percent, the OLAP server 150 may promote the root All 202. In one embodiment, the OLAP server 150 does not generate any predicate for a root member of a hierarchy. That is, the WHERE clause of the generated SQL query 154 may exclude any predicate for the root member (or for any member whatsoever) of the hierarchy. For example, the WHERE clause of the generated SQL query 154 may exclude any predicates for (dimensional constraints of) the Geography hierarchy 200 of FIG. 2C.

In one embodiment, in processing the OLAP query 152, the OLAP server 150 may generate a SQL query 154. For example, in processing the OLAP query of Table III, the OLAP server 150 may generate the following SQL query:

TABLE IV

SQL query example two

SELECT d1.store_country, ...
FROM <fact table FT, dimension tables D1, D2, ... >
WHERE <join fact table to dimension tables>
   AND (D1.store_country=' USA' OR D1.store_city=' Vancouver' )
GROUP BY store_city As shown in Table IV, the SQL query 154 retrieves store sales for the two members (namely, USA 204 and Vancouver 226) in the Geography dimension of the cube 158 for store sales. That is, the SQL query 154 includes a predicate for a parent (or other ancestor) USA 204 rather than predicates for members originally accessed by the SQL query 154 (i.e., prior to any marking/unmarking/promotion of members by the OLAP server 150). More specifically, the OLAP server 150 excludes, from the SQL query 154, predicates for San Jose 214, San Francisco 216, Salem 220, and Portland 222 (e.g., of FIG. 2A). Consequently, the generated SQL query 154 includes two predicates of dimensional constraints (namely, D1.store_country='USA' and D1.store_city='Vancouver') rather than five predicates of dimensional constraints (namely, D1.store_city='San Jose', D1.store_city='San Francisco',D1.store_city='Salem', D1.store_city='Portland', and D1.store_city='Vancouver'). Because the generated SQL query 154 includes three fewer predicates of dimensional constraints, a database server (or in one embodiment, the OLAP server 150 itself) may execute the SQL query 154 more efficiently (i.e., because fewer predicates are to be evaluated). And because the OLAP server 150 generates results 156 for the OLAP query 152 based on results from the SQL query 154, the OLAP server 150 may process the OLAP query 152 more efficiently as a result.

Further, predicates for promoted members of the cube 158 may result in data being over-fetched. Over-fetched data refers to data retrieved from the data 160 by the SQL query 154 that is not required for processing the OLAP query 152. For example, the SQL query of Table IV fetches data for Los Angeles 218 and Tillamook 224, despite such data not being necessary for processing the OLAP query 152 (and which may be subsequently ignored or nevertheless used by the OLAP server 150). However, performance gained from processing fewer predicates may outweigh any performance lost due to over-fetching, resulting in a net performance gain. In certain cases, for example, thresholds of approximately ninety percent have yielded improved net performance (i.e., despite any over-fetching). Thus, a SQL query 154 that includes fewer predicates may be easier for a database server to execute (e.g., to compile, optimize, process, etc.), thereby offsetting an overhead of processing any over-fetched data. Further, a user may also prevent over-fetching altogether by defining a threshold of one hundred percent (of accessed child members out of total child members).

FIG. 3 is a flowchart depicting a method 300 for generating the SQL query 154 from the OLAP query 152 against the cube 158 of FIG. 1, according to one embodiment of the invention. The method 300 may be performed by the OLAP server 150 of FIG. 1. As shown, the method 300 begins at step 310, where the OLAP server 150 receives the OLAP query 152 against the cube 158. At step 320, the OLAP server 150 identifies, based on the OLAP query 152 and definitions for one or more dimension hierarchies for the cube, a level of the hierarchy of a dimension of the cube 158 from which the OLAP query 152 accesses a number of members exceeding a predefined threshold. For example, the OLAP server 150 may identify the City level of FIG. 2A as having a number of members (e.g., San Jose 214 and San Francisco 216) exceeding a predefined threshold for a parent member (e.g., a threshold of sixty percent for California 208). The step 320 (and step 330) is further described below in conjunction with FIG. 4.

At step 330, the OLAP server 150 generates, from (i) the OLAP query 152, (ii) the definition for the one or more dimension hierarchies for the cube 158, and (iii) from the accessed members from the identified level, a SQL query 154 that includes a predicate for a member from at least one level above the identified level in the hierarchy. For example, referring again to the hierarchy 200 of FIG. 2A, the SQL query 154 may include a predicate for California 208 or for USA 204, both of which are above the City level in the hierarchy 200 specified in the original OLAP query. After step 330, the method 300 terminates. Note, a single OLAP query (e.g., OLAP query 152) may result in multiple SQL queries being generated. In general OLAP queries can fetch data at multiple levels of aggregation. Accordingly, in one embodiment, one SQL query is generated for each distinct level of aggregated data referenced by or contained in the OLAP query.

FIG. 4 is a flowchart depicting a method 400 for generating predicates for the OLAP query 152 against the cube 158 of FIG. 1, according to one embodiment of the invention. The method 400 may be performed by the OLAP server 150 of FIG. 1. Further, the method 400 corresponds to steps 320 and 330 of FIG. 3, and is described in conjunction with the hierarchy 200 of FIG. 2A. As shown, the method 400 begins at step 405, where the OLAP server 150 sets the lowest level of the hierarchy as the "current" level. For example, the City level of the hierarchy 200 may be set as the current level. At step 410, the OLAP server 150 identifies a parent member of an accessed member at the current level. For example, California 208 may be identified as the parent node of San Jose 214. At step 420, the OLAP server 150 counts the number of child members of the parent member that are accessed by the OLAP query 152. For example, a total of two accessed child members (namely, San Jose 214 and San Francisco 216) may be counted for California 208. At step 430, the OLAP server 150 determines whether the count exceeds a predefined threshold percentage of child members. For example, the OLAP server 150 may determine that two accessed members out of three total members (i.e., approximately 66.67%) exceeds a predefined threshold of sixty percent. If the predefined threshold is exceeded, the OLAP server 150 may promote the parent member. That is, the OLAP server 150 may mark the parent member as "accessed" (i.e., for which a predicate may be later generated) and unmark accessed child nodes (step 440).

After the step 430 or the step 440, the method 400 proceeds to step 450, where the OLAP server 150 determines whether more accessed members remain to be evaluated. If so, the OLAP server 150 returns to step 410 to evaluate a next accessed member. For example, the OLAP server 150 may evaluate Salem 220 as the next accessed member. Otherwise, the OLAP server determines whether more levels remain to be evaluated that are above the current level in the hierarchy (step 460). If so, the OLAP server sets the level above the current level as the next level to be evaluated (step 470) and then returns to step 410 to evaluate accessed nodes of the newly-set "current" level. For example, each time method 400 loops through steps 410-450, new accessed members may be added to a working set as part of the steps included in this loop. That is, at the start the method 400 begins with a working set of members, and as the method 400 loops through step 410→420→430→440 (optionally)→450→410, one member from the working set is processed. As part of performing these steps, new members might be added to (or removed from) the working set. In other words, each iteration through the loop, the working set may morph. The loop ends once all the members in the working set have been evaluated. In one embodiment, the looping aspect of certain steps in method 400 may be implemented using a recursive programming approach.

For example, the OLAP server may recursively evaluate each level of the hierarchy 200 (e.g., California 214, USA 204, All 202). Otherwise, no members of the hierarchy remain to be promoted, and the OLAP server 150 generates predicates for accessed members of the hierarchy (step 480). For example, referring again to FIG. 2C, predicates for USA 204 and Vancouver 226 may be generated. That is, the OLAP server 150 may generate a SQL query 154 that includes a predicate for USA 204, rather than predicates for San Jose 214, San Francisco 216, Salem 220, and Portland 222. After step 480, the method 400 terminates.

FIG. 5 is a block diagram illustrating components 500 of the OLAP server 150 of FIG. 1, according to one embodiment of the invention. As shown, the OLAP server 150 includes an OLAP query manager 510, a SQL query generator 520, and a results generator 530.

In one embodiment, the OLAP query manager 510 receives an OLAP query 152 against a cube 158. Tables I and III show examples of an OLAP query 152. The SQL query generator 520 creates a SQL query 154 from the OLAP query 152, the cube 158, and definitions of dimension hierarchies for the cubes 158, according to one embodiment. Table IV shows an example of a generated SQL query 154. The results generator 530 creates results 156 for the OLAP query 152, according to one embodiment. For example, the results 156 may be created from the OLAP query 152, the cubes 158, and the data 160. The results may also be created in part from data obtained from executing the SQL query 154 (e.g., either by a database server or by the OLAP server 150 itself). The results generator 530 may also output the results 156 to an output device.

Of course, the embodiments described herein are intended to be illustrative and not limiting of the invention, and other embodiments are broadly contemplated. Further, those skilled in the art will recognize that embodiments of the invention may be adapted to support other OLAP queries, other relational database queries, other ways of defining hierarchies of a dimension of a cube, data models for data warehousing other than cubes, and underlying data stored in databases other than relational databases. Further, various OLAP systems may be supported, e.g., multidimensional OLAP (MOLAP), relational OLAP (ROLAP), hybrid OLAP (HOLAP), and data warehousing and OLAP (DOLAP).

Advantageously, embodiments of the invention provide techniques for generating a relational database query from an OLAP query against a cube. The cube may have dimensions, each dimension having a hierarchy of members. In one embodiment, an OLAP server identifies a level of the hierarchy of a dimension of the cube from which the OLAP query accesses a number of members exceeding a predefined threshold count of members. The OLAP server may generate a relational database query that includes a predicate for at least one member from at least one level above the identified level in the hierarchy, instead of a plurality of predicates for members from the identified level. The OLAP server may generate the relational database query from the OLAP query, from a definition for the hierarchy, and from the accessed members from the identified level. As a result, the generated relational database query may include fewer predicates and thus may be executed more efficiently. Consequently, the OLAP query may also be processed more efficiently. Further, OLAP server may exhibit a smooth performance profile over various OLAP queries (i.e., that access different numbers of members of a hierarchy of the cube).

While the foregoing is directed to embodiments of the present invention, other and further embodiments of the invention may be devised without departing from the basic scope thereof, and the scope thereof is determined by the claims that follow.

What is claimed is:

1. A computer-implemented method for generating a relational query from a multidimensional query against a cube, the cube having a plurality of dimensions, at least one dimension including a hierarchy of members, the method comprising:
    based on a predetermined condition, determining a plurality of members from the hierarchy which predicates are to be included in the relational query, wherein the plurality of members are not specified in the multidimensional query, wherein the predicate for at least one determined member is to be included in lieu of predicates for one or more child members of the at least one determined member that are specified in the multidimensional query, wherein the condition comprises reaching a threshold ratio of the specified one or more child members to all child members of the at least one determined member;
    by operation of one or more computer processors, generating the relational query based on the multidimensional query and the determined plurality of members and without generating any other multidimensional query, wherein the relational query includes the predicate for the at least one determined member in lieu of the predicates for one or more child members of the at least one determined member that are specified in the multidimensional query;
    executing the relational query to obtain a set of query results;
    pruning, from the set of query results, one or more records included because of the at least one determined member, that are not responsive to the multidimensional query; and
    returning the pruned set of query results, responsive to the multidimensional query.

2. The computer-implemented method of claim 1, wherein the determining step is performed recursively up the hierarchy to successively identify levels of the hierarchy from which the predicate for at least one member is to be included in the generated relational query in lieu of the one or more predicates for members from levels immediately below the successively identified levels.

3. The computer-implemented method of claim 2, wherein generating the relational query includes recursively determining wherein the predetermined condition is satisfied for the levels of the hierarchy, wherein the relational query comprises a Structured Query Language (SQL) query, wherein the multidimensional query comprises an online analytical processing (OLAP) query.

4. The computer-implemented method of claim 3, wherein the OLAP query is a Multidimensional Expressions (MDX) query, wherein the plurality of members include a first member at a first level in the hierarchy of a first dimension and a second member at a second level in the hierarchy of the first dimension, wherein the first level is different from the second level, wherein the threshold ratio for the first member is different from the threshold ratio for the second member, and wherein at least one of the threshold ratios is user-configurable.

5. A non-transitory computer-readable storage medium containing a program which, when executed on a processor, performs an operation for generating a relational query from a multidimensional query against a cube, the cube having a plurality of dimensions, at least one dimension including a hierarchy of members, the operation comprising:
    based on a predetermined condition, determining a plurality of members from the hierarchy which predicates are to be included in the relational query, wherein the plurality of members are not specified in the multidimensional query, wherein the predicate for at least one determined member is to be included in lieu of predicates for one or more child members of the at least one determined member that are specified in the multidimensional query, wherein the condition comprises reaching a threshold ratio of the specified one or more child members to all child members of the at least one determined member;
    by operation of one or more computer processors when executing the program, generating the relational query based on the multidimensional query and the determined plurality of members and without generating any other multidimensional query, wherein the relational query includes the predicate for the at least one determined member in lieu of the predicates for one or more child members of the at least one determined member that are specified in the multidimensional query;
    executing the relational query to obtain a set of query results;
    pruning, from the set of query results, one or more records included because of the at least one determined member, that are not responsive to the multidimensional query; and
    returning the pruned set of query results, responsive to the multidimensional query.

6. The non-transitory computer-readable storage medium of claim 5, wherein the determining step is performed recursively up the hierarchy to successively identify levels of the hierarchy from which the predicate for at least one member is to be included in the generated relational query in lieu of the one or more predicates for members from levels immediately below the successively identified levels.

7. The non-transitory computer-readable storage medium of claim 6, wherein generating the relational query includes recursively determining wherein the predetermined condition is satisfied for the levels of the hierarchy, wherein the relational query comprises a Structured Query Language (SQL) query, wherein the multidimensional query comprises an online analytical processing (OLAP) query.

8. The non-transitory computer-readable storage medium of claim 7, wherein the OLAP query is a Multidimensional Expressions (MDX) query, wherein the plurality of members include a first member at a first level in the hierarchy of a first dimension and a second member at a second level in the hierarchy of the first dimension, wherein the first level is different from the second level, wherein the threshold ratio for the first member is different from the threshold ratio for the second member, and wherein at least one of the threshold ratios is user-configurable.

9. A system, comprising:

one or more computer processors; and a memory containing a program, which when executed by the one or more computer processors is configured to perform an operation for generating a relational query from a multidimensional query against a cube, the cube having a plurality of dimensions, at least one dimension including a hierarchy of members, the operation comprising:

- based on a predetermined condition, determining a plurality of members from the hierarchy which predicates are to be included in the relational query, wherein the plurality of members are not specified in the multidimensional query, wherein the predicate for at least one determined member is to be included in lieu of predicates for one or more child members of the at least one determined member that are specified in the multidimensional query, wherein the condition comprises reaching a threshold ratio of the specified one or more child members to all child members of the at least one determined member;
- generating the relational query based on the multidimensional query and the determined plurality of members and without generating any other multidimensional query, wherein the relational query includes the predicate for the at least one determined member in lieu of the predicates for one or more child members of the at least one determined member that are specified in the multidimensional query;
- executing the relational query to obtain a set of query results;
- pruning, from the set of query results, one or more records included because of the at least one determined member, that are not responsive to the multidimensional query; and
- returning the pruned set of query results, responsive to the multidimensional query.

10. The system of claim 9, wherein the determining step is performed recursively up the hierarchy to successively identify levels of the hierarchy from which the predicate for at least one member is to be included in the generated relational query in lieu of the one or more predicates for members from levels immediately below the successively identified levels.

11. The system of claim 10, wherein generating the relational query includes recursively determining wherein the predetermined condition is satisfied for the levels of the hierarchy, wherein the relational query comprises a Structured Query Language (SQL) query, wherein the multidimensional query comprises an online analytical processing (OLAP) query.

12. The system of claim 11, wherein the OLAP query is a Multidimensional Expressions (MDX) query, wherein the plurality of members include a first member at a first level in the hierarchy of a first dimension and a second member at a second level in the hierarchy of the first dimension, wherein the first level is different from the second level, wherein the threshold ratio for the first member is different from the threshold ratio for the second member, and wherein at least one of the threshold ratios is user-configurable.

* * * * *